United States Patent Office 2,846,270
Patented Aug. 5, 1958

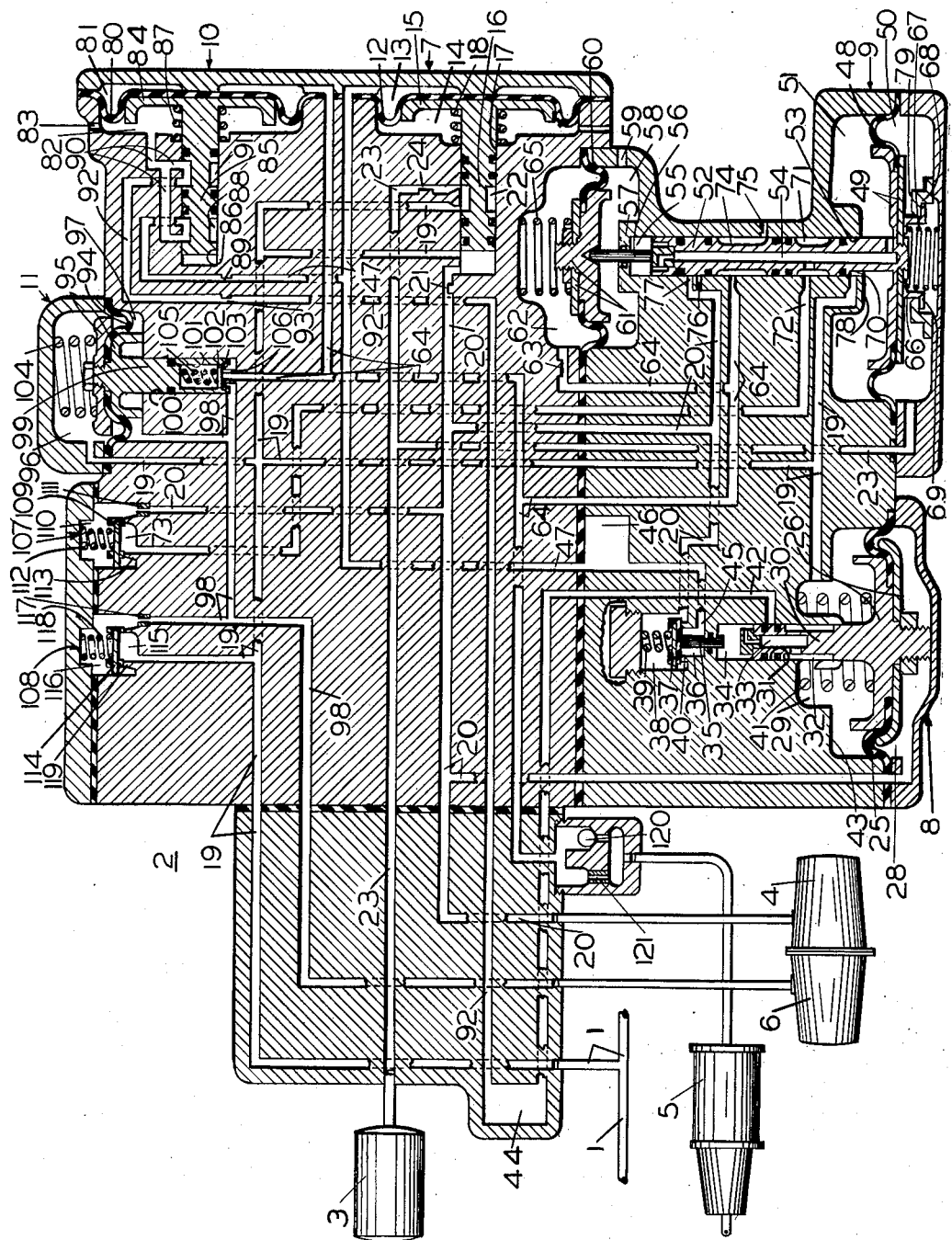

2,846,270

FLUID PRESSURE BRAKE APPARATUS

Earle S. Cook, Forest Hills, Pa., assignor to Westinghouse Air Brake Company, Wilmerding, Pa., a corporation of Pennsylvania Application June 28, 1954, Serial No. 439,706

7 Claims. (Cl. 303—46)

This invention relates to fluid pressure brake apparatus and more particularly to the type in which the degree of brake application and release is varied according to the extent of reduction and restoration, respectively, in pressure of fluid in a brake pipe relative to a datum pressure in a control reservoir.

The principal object of this invention is to provide an improved, relatively inexpensive brake apparatus of the above general type especially adapted for use with lightweight railway cars for high speed passenger service.

Another object is to provide an improved brake apparatus of the above general type embodying novel means whereby fluid under pressure will be supplied from an emergency reservoir whenever brake pipe pressure is reduced below a chosen value, lower than that corresponding to a full service application of brakes, for effecting an emergency application of brakes; and whereby a quick service reduction wave will be propagated rearward through the brake pipe at substantially the same rate during both service and emergency applications of brakes.

Another object is to provide an apparatus of the above general type embodying means for preventing continuous leakage of brake pipe pressure to atmosphere in event of brake cylinder leakage in excess of a preselected rate, when used with a brake valve having a flat maintaining feature.

Other objects and advantages will become apparent from the following more detailed description of the invention and from the accompanying drawing, wherein the single figure is a diagrammatic view of a portion of a brake apparatus embodying the invention.

*Description*

Referring to the drawing, the improved apparatus comprises the usual brake pipe 1, which is adapted to extend through a train and to be supplied with fluid at a pressure controlled, in the well-known manner, by manual operation of an engineer's brake valve device (not shown) provided on the locomotive. The apparatus further comprises a brake controlling valve device 2 for each brake-equipped car of the train adapted to respond to a reduction in pressure in the brake pipe 1 relative to a datum pressure in a control reservoir 3 for supplying fluid under pressure from an auxiliary reservoir 4 to a brake cylinder device 5 for effecting a corresponding degree of service application of the brakes on the respective car; however, upon a reduction in brake pipe pressure to or below a chosen value, lower than that corresponding to a full service application of the brakes, said valve device is adapted to supply fluid under pressure to said brake cylinder device from an emergency reservoir 6, as well as from the auxiliary reservoir 4, for providing a greater, emergency degree of braking on said car. The valve device 2 is adapted to respond to an increase in brake pipe pressure for releasing fluid under pressure from the brake cylinder device 5 to release the brakes on the car and, at a time when said brake cylinder device is devoid of fluid under pressure, opening the auxiliary reservoir 4 and control reservoir 3 to the brake pipe 1, in the manner hereinafter to be described.

The brake controlling valve device 2 comprises a combination pipe bracket and sectionalized casing, to which bracket are adapted to be connected the control reservoir 3, auxiliary reservoir 4, brake cylinder device 5, emergency reservoir 6, and a branch of the brake pipe 1. The valve device 2 also comprises a charging valve device 7 for controlling fluid pressure communication of the brake pipe 1 with the reservoirs 3, 4; a quick service valve device 8 adapted to respond to a slight reduction in brake pipe pressure for locally effecting, on the respective car, a further, quick service reduction in brake pipe pressure for thereby increasing the rate of propagation of the brake-actuating pressure reduction wave rearward through the brake pipe 1 to the next brake-equipped car in the train; a service valve device 9 for controlling supply of fluid under pressure to, and release of the same from, the brake cylinder device 5 and also controlling initial recharging of the auxiliary reservoir 4 from the brake pipe 1; an exhaust valve device 10 for partly controlling operation of the charging valve device 7 and for other reasons hereinafter to be explained; and a high pressure valve device 11 for controlling the supply of fluid under pressure from the emergency reservoir 6 to the brake cylinder device 5; all of the devices just enumerated being formed within, and in part defined by, the various sections of the casing.

The charging valve device 7 preferably comprises a flexible diaphragm 12, which is suitably clamped adjacent its outer peripheral edge between sections of the casing and separates a pressure chamber 13 from an atmospheric chamber 14 which is open to atmosphere by way of a suitable port in said casing. The diaphragm 12 is operatively connected, through the medium of a diaphragm follower 15, to a coaxially arranged combination follower stem and valve, hereinafter to be referred to as slide valve 16, which is preferably formed integrally with said follower and extends through chamber 14 and has slidable, sealing engagement with the wall of an aligned bore 17 in the casing.

In operation, when the pressure chamber 13 is substantially devoid of fluid under pressure, under a condition hereinafter to be described, a helical bias spring 18 in chamber 14 acting through the medium of follower 15 urges the slide valve 16 to a charging position, in which it is shown in the drawing. In this position, the unattached or free end of slide valve 16 (i. e., the end farthest from the follower 15) is so disposed that a passage 19 is uncovered to a passage 20 containing a choke 21, for permitting fluid under pressure to flow from the brake pipe 1 through passage 19 and thence, at the rate controlled by said choke, via passage 20 to the auxiliary reservoir 4 for charging said reservoir. And also, with slide valve 16 in charging position, an elongated annular groove or cavity 22 formed in said slide valve intermediate its ends connects a branch of passage 19 to a passage 23 containing a choke 24, for permitting fluid under pressure to flow from the brake pipe 1 through passage 19 and thence, at the rate controlled by said choke, via passage 23 to the control reservoir 3. When, under another condition, the pressure chamber 13 is charged with fluid at a pressure sufficient to overcome resistance of the light bias spring 18, the slide valve 16 will assume a cut-off position, in which the passage 19 is disconnected from the passages 20, 23 for thereby closing the brake pipe 1 to the auxiliary reservoir 4 and control reservoir 3, respectively.

The quick service valve device 8 preferably comprises a flexible diaphragm 25 which is clamped adjacent its outer peripheral edge between sections of the casing and is suitably clamped adjacent its inner peripheral edge between portions of a follower 26. The diaphragm 25 is subject at one side to fluid pressure in a chamber 28 open to the auxiliary reservoir 4 by way of a branch of passage 20, and is subject at the opposite side to fluid pressure in a chamber 29 open to the brake pipe 1 by way of a branch of passage 19. Preferably formed integrally with one of the portions of follower 26 is a combination follower stem and valve, hereinafter to be referred to as slide valve 30, which extends through chamber 29 and projects into an aligned bore 31 in the casing; said slide valve having slidable, sealing engagement with the wall of said bore. Formed in the slide valve 30 intermediate its ends is an annular cavity 32 which constantly connects chamber 29 to an internal passageway 33 that opens through the projecting end of said slide valve into a chamber 34, defined by the base and surrounding wall of bore 31 and the projecting end of said slide valve, in order that opposing fluid pressures will be effective upon equal areas of the diaphragm 25, unaffected by the diameter of said slide valve. The projecting end of slide valve 30 is adapted for abutting engagement with one end of a coaxially arranged actuating stem 35 that projects through a casing partition separating chamber 34 from a chamber 36; said stem having slidable, sealing engagement with the wall of a bore through said partition. At its opposite end the stem 35 is coaxially attached to a preferably disc-shaped check valve 37 which controls fluid pressure communication between the chamber 36 and a chamber 38 that is constantly open to the auxiliary reservoir 4 by way of a branch of passage 20. For normally preventing fluid pressure communication between the chambers 36, 38, a helical bias spring 39 disposed in chamber 38 urges the check valve 37 into seating engagement with an annular valve seat rib 40 encircling the upper end of chamber 36; and with said check valve thus seated, the stem 35 projects coaxially, and with substantial radial clearance in chamber 36, into the chamber 34.

In operation, when brake pipe pressure in chamber 29 is substantially equal to auxiliary reservoir pressure in chamber 28, a helical bias spring 41 disposed in chamber 29 and acting on follower 26 causes the slide valve 30 to assume a normal position, in which it is shown in the drawing. In this position, the projecting end of slide valve 30 is disengaged from the check valve actuating stem 35, with the result that the check valve 37 is held seated by action of spring 39; and the cavity 32 is out of registry with a passage 42, presently to be described. However, upon a slight reduction in pressure in the brake pipe 1 and hence in chamber 29, the diaphragm 25 is adapted to deflect against the light resistance of spring 41 for moving slide valve 30 to a quick service position, defined by engagement of follower 26 with a stop surface 43 formed by a part of the casing adjacent chamber 29. During such movement, cavity 32 of slide valve 30 will first connect chamber 29 to passage 42 for thereby causing fluid under pressure to flow from the brake pipe 1 via chamber 29 to passage 42 and thence to a so-called quick service volume 44 for locally effecting a further quick service reduction in brake pipe pressure; and then the projecting end of said slide valve will engage the actuating stem 35 and, through such engagement, unseat the check valve 37 against resistance of spring 39. With check valve 37 thus unseated, fluid under pressure from the auxiliary reservoir 4 will flow via passage 20 to chamber 38 and then past check valve 37 to chamber 36, whence it will flow via a passage 45 to a so-called timing volume 46 and thence via branches of a passage 47 to the pressure chamber 13 of the charging valve device 7 and to another communication hereinafter to be described; if preferred, however, said timing volume may be eliminated and the volume of chamber 13 correspondingly enlarged, such that passage 45 leads directly to the enlarged chamber 13.

The service valve device 9 preferably comprises a flexible diaphragm 48 which is clamped adjacent its outer peripheral edge between sections of the casing and is suitably clamped adjacent its inner peripheral edge between portions of a diaphragm follower 49. The diaphragm 48 is subject at one side to fluid pressure in a chamber 50 constantly open to the control reservoir 3 by way of a branch of passage 23; and said diaphragm is subject at the opposite side to fluid pressure in a chamber 51. Preferably formed integrally with one of the portions of the follower 49 is a combination stem and valve, hereinafter to be referred to as slide valve 52, which extends through chamber 51 and projects into an aligned bore 53 in the casing; said slide valve having slidable, sealing engagement with the wall of said bore. The slide valve 52 has an internal passageway 54 which constantly connects the chamber 51 with a chamber 55 defined by the base and surrounding wall of bore 53 and the projecting end of said slide valve, so that opposing fluid pressures acting on the diaphragm 48 will be effective on equal areas thereof. At its projecting end the slide valve 52 is adapted to engage a coaxially aligned stem 56 which has slidable, sealing engagement with the wall of a bore through a casing partition 57 separating chamber 55 from a chamber 58 which is open to atmosphere via a port 59. A flexible diaphragm 60, clamped adjacent its outer peripheral edge between portions of the casing and adjacent its inner peripheral edge between portions of a follower 61, separates atmospheric chamber 58 from a chamber 62 which is open to the brake cylinder device 5 by way of a choke 63 and a passage 64. A helical bias spring 65, disposed in chamber 62 and acting on follower 61, urges the diaphragm 60 in the direction of chamber 58 for thereby causing said follower to engage the stem 56 and, through such engagement, to urge the slide valve 52 to a normal position, in which it is shown in the drawing, and which position will be assumed under certain conditions hereinafter to be described. In such position, the follower 49 abuts one end of a coaxially arranged spring support 66, which is disposed in chamber 50 and retains a helical spring 67; said spring support being slidable within a bore through a spring support guide 68 that is suitably attached to the casing within said chamber 50. With slide valve 52 in normal position, the spring support 66 is stopped at the limit of its movement in the direction of chamber 51 by engagement of an outwardly directed, radial flange 69 on said support with a radial shoulder formed on the guide 68 in encirclement of the last mentioned bore.

It should be noted that the value of spring 67 is greater than that of spring 65; and hence with slide valve 52 in normal position, the follower 49 merely engages the spring support 66 without compressing the spring 67. Moreover, spring 65 is of such value as to assure complete release of fluid pressure from chamber 62, and hence from the brake cylinder device 5, when the brake pipe 1 has been recharged to a pressure within a few, such as 3 p. s. i., of that in the control reservoir 3.

With the slide valve 52 in normal position, an elongated groove 70 formed in said slide valve uncovers the brake pipe passage 19 to the chamber 51; an elongated annular groove or cavity 71, formed in said slide valve and constantly open to the passageway 54, is in registry with a passage 72 leading to a chamber 73, for reasons hereinafter to be explained; an elongated annular groove or cavity 74, also formed in said slide valve, connects a branch of passage 64 with a brake cylinder release choke 75 that controls the rate of release of fluid under pressure from the brake cylinder device 5 to atmosphere; and said slide valve laps off a restricted port 76 and a port 77, which ports are arranged in parallel and both constantly open to the passage 20 leading to the auxiliary reservoir 4, the restricted port 76 being disposed intermediate the port 77 and passage 64.

In operation, upon a reduction in pressure in the brake pipe 1 and hence in chamber 51, the diaphragm 48 will deflect and shift slide valve 52 to an application position, defined by engagement of follower 49 with a suitable stop surface 78, such as the annular surface of the casing encircling the end of bore 31 adjacent chamber 51. In this position, cavity 74 is disconnected from the release choke 75 and connects the ports 76, 77 to passage 64, for supplying fluid under pressure from the auxiliary reservoir 4 to the brake cylinder device 5; groove 70 connects brake pipe passage 19 to chamber 51; but cavity 71 is out of registry with passage 72, for reasons to be explained subsequently.

If, with the slide valve 52 in a normal or release position, pressure in the brake pipe 1 and hence in chamber 51 is increased more than a small extent, such as .7 p. s. i., above control reservoir pressure in chamber 50, the resultant deflection of diaphragm 48 against resistance of spring 67 will shift valve 52 to a so-called retarded recharge position, defined by engagement of follower 49 with a stop surface 79 formed by the adjacent end of spring support guide 68. With slide valve 52 in this position, groove 70 is disconnected from brake pipe passage 19 for cutting off supply of fluid under pressure from the brake pipe 1 to chamber 51, for reasons hereinafter to be explained; cavity 74 connects passage 64 to release choke 75 and disconnects said passage 64 from the ports 76, 77; and cavity 71 connects chamber 51, by way of internal passageway 54, to passage 72.

It should be noted that the cavity 71 is in registry with passage 72 in all positions of the slide valve 52, including those hereafter to be described, except application position; and that groove 70 is in registry with brake pipe passage 19 in all positions of said slide valve, including those hereafter to be described, except retarded recharge position, for reasons hereinafter to be explained. Moreover, the area of diaphragm 48 relative to that of diaphragm 60 is such as to provide, for each one p. s. i. of brake pipe reduction, a proportionate increase, such as 2.5 p. s. i., in brake cylinder pressure in chamber 62; such ratio in areas being small enough to assure desired sensitivity in the control of the brakes without requiring excessive reductions in brake pipe pressure to effect a desired degree of increase in brake cylinder pressure. The capacities of the auxiliary reservoir 4 and brake cylinder device 5 are such, in relation to the selected ratio in areas of diaphragms 48 and 60, as to provide equalization of brake cylinder pressure with auxiliary reservoir pressure when brake pipe pressure has been reduced to an extent corresponding to a full service application of the brakes. It should also be noted that the choke 63 is provided for limiting the build up in pressure in the chamber 62 acting on diaphragm 60 to a degree substantially in unison with that in the brake cylinder device 5 by way of slide valve cavity 74. It will also be noted that spring 67 is effective only in urging movement of slide valve 52 from retarded recharge position to normal position.

The exhaust valve device 10 preferably comprises a flexible diaphragm 80 which is clamped adjacent its outer peripheral edge between sections of the casing and separates a pressure chamber 81, open to brake cylinder passage 64, from an atmospheric chamber 82 open to atmosphere via a port 83. The diaphragm 80 is connected through the medium of a follower 84 to a coaxially arranged combination follower stem and valve, hereinafter to be referred to as slide valve 85, which is preferably formed integrally with said follower and extends through chamber 82 and has slidable, sealing engagement with the wall of the aligned bore 86 in the casing.

In operation, when the brake cylinder device 5 and hence passage 64 and pressure chamber 81 are substantially devoid of fluid under pressure, a helical bias spring 87 in chamber 82 acting on follower 84 urges the slide valve 85 to an exhaust position, in which it is shown in the drawing. With the slide valve 85 in this position, an elongated annular cavity 88 formed in said slide valve intermediate its ends connects a branch of passage 47 containing a choke 89 to an exhaust passage 90, which is open to atmosphere by way of atmospheric chamber 82. And also, with slide valve 85 in this position, a cavity 91, similar to and spaced apart from cavity 88, connects a branch of the exhaust passage 90 to a passage 92, which contains a choke 93 and leads to the quick service volume 44. However, when fluid under pressure is supplied via brake cylinder passage 64 to the pressure chamber 81, the diaphragm 80 will deflect against resistance of spring 87 and shift slide valve 85 to a cutoff position, in which cavities 88, 91 will be out of registry with the respective passages 47 and 92, which latter two passages will be dead ended at said slide valve. The chokes 89 and 93 are provided for reasons hereinafter to be explained.

The high pressure valve device 11 preferably comprises a flexible diaphragm 94 clamped adjacent its outer peripheral edge between sections of the casing and suitably clamped adjacent its inner peripheral edge between portions of a follower 95. The diaphragm 94 is subject at one side to fluid pressure in a chamber 96 open to a branch of of the brake pipe passage 19; and said diaphragm is subject at the opposite side to fluid pressure in a chamber 97 open to the emergency reservoir 6 by way of a passage 98. Preferably formed integrally with the follower 95 is a coaxially arranged follower stem 99 which extends through chamber 97 and projects into an aligned bore 100 in the casing; said stem having slidable, sealing engagement with the wall of said bore. Extending coaxially inward from the projecting end of stem 99 is a bore 101 in which is slidably mounted a disc-shaped poppet valve 102 that is suitably retained within said bore by a retaining ring 103 partly accommodated within a groove formed in the wall of said bore near the projecting end of said stem.

In operation, when the brakes are released or a service application of brakes is in effect, the combined effect of a helical regulating spring 104 in chamber 96 and brake pipe pressure in said chamber will maintain the diaphragm 94 in a normal position, in which it is shown in the drawing, against opposing effects of emergency reservoir pressure in chamber 97. Under such condition, a helical bias spring 105 disposed in bore 101 of stem 99 will maintain valve 102 seated against a coaxially arranged, annular valve seat rib 106 formed by a portion of the casing encircling a branch of brake cylinder passage 64. However, upon a reduction in pressure in the brake pipe 1 and hence in chamber 96 to or below a chosen value, lower than that corresponding to a full service reduction, the diaphragm 94 will be deflected to an emergency position by preponderating effect of fluid pressure in chamber 97. During such deflection of the diaphragm 94, the stem 99 will carry the valve 102 away from the seat rib 106 for opening the last mentioned branch of passage 64 to a branch of passage 98 and thus permitting fluid under pressure from the emergency reservoir 6 to flow via passage 98, past unseated valve 102 and thence via passage 64 to the brake cylinder device 5 for augmenting pressure in the latter device over that obtained by equalization of that in the auxiliary reservoir 4; it being noted that valve 102 will be retained within the stem 99 by engagement, under action of spring 105, with the retaining ring 103.

The improved brake apparatus further comprises an auxiliary reservoir charging check valve device 107 and an emergency reservoir charging check valve device 108. The device 107 comprises a preferably disc-shaped check valve 109 subject at one side to fluid pressure in chamber 73, and at the opposite side to fluid pressure in a chamber 110 which is open through a choke 111 to a branch of auxiliary reservoir passage 20. For normally preventing fluid pressure communication between the chambers 73, 110, a helical bias spring 112 in chamber 110 urges the check valve 109 into engagement with an annular valve seat rib 113 formed by a projecting part of the casing encircling chamber 73. The spring 112 is of such value as to maintain the check valve 109 seated unless pressure in chamber 73 exceeds that in chamber 110 by a certain degree such as 1.7 p. s. i.; this permits the auxiliary reservoir 4 to be recharged from the brake pipe, by way of the service valve device 9 and passage 72, at a rate controlled by choke 111 and to a pressure 1.7 p. s. i. less than the pressure in chamber 51, prior to movement of the diaphragm 12 of the charging valve device 7 to charging position at the end of a brake releasing operation, as will be explained subsequently in greater detail.

The emergency reservoir charging check valve device 108 comprises a preferably disc-shaped check valve 114 subject at one side to fluid pressure in a chamber 115 open to brake pipe passage 19, and at the opposite side to fluid pressure in a chamber 116 open through a choke 117 to a branch of emergency reservoir passage 98. For normally preventing fluid pressure communication between the chambers 115, 116, a helical bias spring 118 in chamber 116 urges check valve 114 into engagement with a valve seat rib 119 formed by a projecting part of the casing encircling the chamber 115. A choke 117 is provided for restricting the rate of flow of fluid under pressure from the brake pipe 1 to the emergency reservoir 6 to a sufficient degree to prevent undesirable, excessive depletion of brake pipe pressure during initial charging of the apparatus and during recharging of the apparatus following an emergency application of the brakes.

Interposed between passage 64 and the brake cylinder device 5 are a preferably ball-type check valve 120 and an application choke 121, which are arranged in parallel. The application choke 121 restricts the rate at which fluid under pressure is supplied via passage 64 to the brake cylinder device 5; whereas the check valve 120 permits fluid under pressure to be released from said brake cylinder device to passage 64 but prevents flow in the reverse direction. It will be noted from the previous description that the rate at which fluid under pressure is released from brake cylinder passage 64 to atmosphere is controlled by the capacity of the release choke 75. Hence the application choke 121 and release choke 76 are of such selected capacities as to respectively provide optimum rates of flow of fluid under pressure to and from the brake cylinder device 5 for minimizing run-in and run-out of slack, etc.

*Operation*

With the brake apparatus devoid of fluid under pressure, the various components will assume the respective positions in which they are shown in the drawing.

*Initial charging of the brake apparatus*

To initially charge the brake apparatus on a train, it is customary for the engineer to first move the handle of the usual automatic brake valve device (not shown) to a release position for supplying fluid at a relatively high pressure from the usual main reservoir (not shown) on a locomotive to the brake pipe 1 at the locomotive; and then, after the brake pipe 1 has been substantially recharged, to move said handle to a running position for supplying fluid to said brake pipe at a lesser pressure corresponding to the normal operating value of pressure in said brake pipe.

Some of the fluid under pressure thus supplied to the brake pipe 1 will flow via one branch of passage 19 past the end of slide valve 16 of charging device 7 and thence, at the rate controlled by choke 21, via passage 20 to the auxiliary reservoir 4 for charging said reservoir; and some of such fluid will flow via another branch of brake pipe passage 19, through cavity 22 in said slide valve 16, and thence, at the rate controlled by choke 24, via the passage 23 to the control reservoir 3 for charging the latter reservoir. Meanwhile, some of the fluid under pressure supplied to brake pipe passage 19 will flow to chamber 115 and unseat and flow past check valve 114 to chamber 116, whence it will flow, at the rate controlled by choke 117 via passage 98 to the emergency reservoir 6 for charging said reservoir. And, at the same time, some of such fluid will also flow from the brake pipe 1 via still other branches of passage 19 to chamber 96 of the high pressure valve device 11 and to chamber 29 of the quick service valve device 8; and in consequence of such flow, said valve devices will remain in the positions in which they are shown in the drawing, against opposing effects of fluid supplied from the emergency reservoir passage 98 to chamber 97 of the high pressure valve device 11 and from the auxiliary reservoir passage 20 to chamber 28 of the quick service valve device 8.

Meanwhile, some of the fluid under pressure supplied to brake pipe passage 19 will flow via groove 70 to chamber 51 of the service valve device 9 on each car; and if, as will generally be the case, especially in cars at the head of the train, pressure in chamber 51 is thus increased to a value more than the illustrative .7 p. s. i. over that in the control reservoir 3 acting in chamber 50, the diaphragm 48 will deflect against spring 67 and shift slide valve 52 to retarded recharge position for cutting off further supply of fluid under pressure from the brake pipe 1 to said chamber 51 and thus permitting a greater volume of fluid under pressure in the brake pipe to be available toward the rear of the train for more uniformly and rapidly charging the apparatus throughout the train.

Since the slide valve cavity 71 connects chamber 51 with passage 72 when the slide valve 52 is in retarded recharge position, at least some of the fluid pressure in chamber 51 may be dissipated by flow, at the rate controlled by choke 111, via cavity 71 and past the auxiliary reservoir charging check valve 109 to the auxiliary reservoir 4, although such flow will cease if and when auxiliary reservoir pressure is increased to a value within the illustrative 1.7 p. s. i. of that in chamber 51, as controlled by the value of spring 112; it being noted that said auxiliary reservoir is also being concurrently charged by previously described flow via charging valve device 7 at the rate controlled by choke 21. Hence some fluid under pressure will generally be temporarily trapped in chamber 51 until control reservoir pressure in chamber 50 is increased (by previously described flow to control reservoir 3 via charging valve device 7), to a value within the illustrative .7 p. s. i. of that in the chamber 51; whereupon diaphragm 48 will deflect and shift slide valve 52 toward or to normal position for reestablishing communication between the brake pipe passage 19 and chamber 51 and thus permitting a resumption of supplemental charging of the auxiliary reservoir 4 by way of the check valve 109. The effective rate at which the auxiliary reservoir 4 on a particular car is supplementarily charged by way of the corresponding service valve device 9 will thus depend upon the rates at which said auxiliary reservoir and the corresponding control reservoir 3 are charged by way of the charging valve device 7 on such car.

Since charging of the auxiliary reservoir 4 by way of the service valve device 9 and check valve 109 will cease when pressure in said auxiliary reservoir is within 1.7 of that in chamber 51, final charging of the auxiliary reservoir 4 through the last few p. s. i. of build up to equality with normal operating pressure in the brake pipe 1 will be accomplished solely by way of the charging valve device 7. Since at the completion of initial charging the auxiliary reservoir 4 and control reservoir 3 will be charged to normal operating pressure in the brake pipe 1 by way of the charging valve device 7, the various components of the brake apparatus will be in the respective positions in which they are shown in the drawing.

Service application of the brakes

To initiate a service application of the brakes, the engineer moves the handle of the aforementioned automatic brake valve device to a service position for effecting a desired degree of reduction in pressure in the brake pipe 1, but not exceeding a full service reduction corresponding to that for a full service application of the brakes; whereupon he moves said handle to a flat maintaining position for maintaining fluid in said brake pipe at the desired reduced pressure.

When the pressure in brake pipe 1, and hence in chamber 29 of the quick service valve device 8 on a brake-equipped car at the head of the train, is thus reduced a slight degree, such as .7 p. s. i., the diaphragm 25 will deflect and shift slide valve 30 to its previously defined quick service position for causing pressure in said brake pipe to be rapidly reduced an additional degree by flow via brake pipe passage 19, chamber 29, cavity 32, and passage 42 to the vented quick service volume 44; with the result that a so-called quick service reduction wave will be propagated rearward from such car through the brake pipe to the next brake-equipped car, where the operation will be repeated for further propagating said wave rearward so as to thereby rapidly and uniformly initiate an application of the brakes throughout the train. It will be noted that, since exhaust slide valve 85 is still in exhaust position, the quick service volume 44 will be open to atmosphere by way of passage 92, choke 93, cavity 91, passage 90 and exhaust chamber 82, thereby assuring that brake pipe pressure will be further reduced (after initial charging of said quick service volume 44) at the rate controlled by choke 93 to the extent necessary for insuring operation of the service valve device 9 to application position, in the manner hereinafter to be described.

With the slide valve 30 of quick service valve device 8 in service position, the end of said slide valve, through engagement with actuating stem 35, will maintain check valve 37 unseated against resistance of bias spring 39 for supplying fluid under pressure from auxiliary reservoir passage 20 to passage 45 and thence to the timing volume 46. With exhaust slide valve 85 in exhaust position, as already noted, the timing volume 46 is open to atmosphere via one branch of the passage 47, choke 89, exhaust slide valve cavity 88 and exhaust passage 90; however, due to the restricted flow through said one branch of passage 47 by reason of choke 89, fluid under pressure will flow from said timing volume via another branch of passage 47 to chamber 13 of charging valve device 7 for rapidly deflecting diaphragm 12 against resistance of bias spring 18 and thereby shifting valve 16 to cut-off position, in which brake pipe passage 19 is disconnected from both the auxiliary reservoir passage 20 and the control reservoir passage 23, as heretofore explained in detail.

When, by operation of the quick service valve device 8 on a particular car, brake pipe pressure in passage 19 and hence in chamber 51 of the corresponding service valve device 9 has thus been locally reduced to a sufficient degree, slide valve 52 will be shifted to its previously defined application position by preponderant effect of control reservoir pressure in chamber 50 acting on diaphragm 49. With slide valve 52 in application position, fluid under pressure will flow from the auxiliary reservoir 4 via passage 20, the parallel-connected ports 77, 76, and cavity 74 to passage 64. Some of the fluid thus supplied to passage 64 will flow to chamber 81 of exhaust valve device 10 and cause diaphragm 80 to deflect and shift slide valve 85 to cut-off position against resistance of bias spring 87 for thereby closing off quick service volume 44 and timing volume 46 from atmosphere; and some of such fluid will flow at the rate controlled by application choke 121 to the brake cylinder device 5 for effecting an application of the brakes on the car; and some of such fluid will also flow at the rate controlled by the choke 63 to chamber 62 of service valve device 9 whereby the pressure in chamber 62 will increase substantially in unison with that in the brake cylinder device 5.

When the pressure in chamber 62 has thus been increased to a sufficient extent, corresponding to the chosen reduction in brake pipe pressure, the slide valve 52 will be shifted by action of spring 65 in the direction of chamber 50 to a lap position, in which the slide valve cavity 74 is disconnected from ports 77, 76 and release choke 75 for thereby bottling up fluid under pressure in passage 64, and hence in the brake cylinder device 5 and chamber 62.

If there should be leakage of fluid under pressure from the brake cylinder device 5, brake cylinder passage 64 or the intervening communication, but such leakage is within a chosen permissible or normal limit, slide valve 52 may be shifted, in consequence of the slightly reduced pressure in chamber 62, to a leakage maintaining position, in which cavity 74 connects only the restricted brake cylinder maintaining port 76 to brake cylinder passage 64 for maintaining pressure in said brake cylinder device; but if such leakage exceeds the chosen normal limit, as determined by the selected flow capacity of the port 76, brake cylinder pressure in the chamber 62 will blow down faster than such pressure is being replenished via said port, with the result that said slide valve will either periodically shift to, or continuously remain in, application position in an attempt to make up such leakage. Since, as heretofore noted, cavity 71 is in registry with passage 72 except when slide valve 52 is in application position, it will be noted that if brake cylinder leakage is within the normal limit, auxiliary reservoir pressure will always be maintained at least at a minimum value (viz, the illustrative 1.7 p. s. i. less than existing pressure in chamber 51) by flow of fluid under pressure from the brake pipe 1 via chamber 51 and past the check valve 109, for thereby providing what might be termed a virtually inexhaustible supply of fluid under pressure in the auxiliary reservoir 4 and hence brake cylinder device 5. However, since the slide valve cavity 71 is disconnected from passage 72 when slide valve 52 is in application position, this so-called inexhaustible supply of fluid under pressure from the brake pipe 1 to the auxiliary reservoir 4, in the manner just described, is prevented so that when brake cylinder leakage is excessive, such as due to a broken cylinder pipe, brake pipe pressure will not be continuously depleted and will not jeopardize the uniformity of application of brakes throughout the rest of the train as will be explained presently.

Release of the brakes

To release the brakes following a service application thereof, the engineer moves the handle of the aforementioned brake valve device, first to release position and then, after the lapse of a period of time hereinafter to be described, to running position for successively supplying fluid to the brake pipe 1, first at main reservoir pressure and then at a lesser pressure, viz, normal operating brake pipe pressure. By use of this procedure, a high pressure head is provided in the brake pipe adjacent the locomotive for initiating a more rapid and uniform release of the brakes throughout the train; and then, as the apparatus becomes substantially recharged to normal pressure, brake pipe pressure is reduced to normal operating value so as to protect against the possibility of overcharging the control reservoir 3 and auxiliary reservoir 4.

Some of the fluid under pressure thus supplied to the brake pipe 1 will flow via one branch of passage 19 to chamber 29 of quick service valve device 8 and cause diaphragm 25 to deflect and shift slide valve 30 to normal position, if such deflection had not occurred during the preceding brake application as a result of reduced pressure in the auxiliary reservoir 4 and hence in chamber 28. With slide valve 30 in normal position, fluid under pressure will be bottled up in the quick service volume 44 and, since check valve 37 will not be seated, fluid under pressure will also be bottled up in the timing volume 46 at substantially the reduced pressure obtained in the auxiliary reservoir 4 during the preceding brake application; it being noted that the exhaust slide valve 85 is in cut-off position and will remain in such position until pressure in chamber 81 is reduced to substantially atmospheric, in the manner to be described presently.

Meanwhile, some of the fluid under pressure will flow via another branch of passage 19 to chamber 51 of the service valve device 9. If, on a particular car, the combined effect of increased pressure in chamber 51, brake cylinder pressure in chamber 62, and action of spring 65 urging the diaphragm stack (i. e., diaphragms 48, 60 and slide valve 52) in one direction, exceeds the opposing effect on said stack of control reservoir pressure in chamber 50 and action of spring 67 by a degree equivalent to the effect of at least a 1.7 p. s. i. preponderance in pressure in chamber 51 over that in chamber 50, the slide valve 52 will be shifted to retarded recharge position; otherwise said slide valve will merely move to normal position.

In those cars where the slide valve 52 is moved to retarded recharge position, further supply of fluid under pressure from the brake pipe 1 to chamber 51 will be cut off for desirably providing a greater pressure head in the brake pipe 1 in the rearward cars and thereby more rapidly and uniformly initiating a release of the brakes throughout the train; and at the same time, fluid under pressure will be released from the brake cylinder device 5 and chamber 62 via slide valve cavity 74 at the rate controlled by release choke 75, until said slide valve is shifted to normal position, in which brake cylinder pressure will continue to be released via the communication just described.

In those cars in which the slide valve 52, either initially or in the manner just described subsequently moves to normal position, communication between the brake pipe passage 19 and chamber 51 will be reestablished for recharging the auxiliary reservoir 4 from the brake pipe 1 by flow via the communication previously described in connection with initial charging, including slide valve cavity 71 and past check valve 109.

The effective rate at which the auxiliary reservoir is thus recharged will be controlled by the rate at which brake cylinder pressure is released via release choke 75, for if pressure in chamber 51 tends to increase at a faster rate, slide valve 52 will be shifted to retarded recharge position and suspend such recharge until brake cylinder pressure is reduced sufficiently to cause the slide valve to return to normal position. And the extent to which the auxiliary reservoir 4 is thus recharged will depend upon the selected degree of increase in pressure in the brake pipe 1 and hence in chamber 51.

It therefore follows that in the case of a partial release of the brakes, the auxiliary reservoir 4 will be recharged to an extent proportionate to the extent of release of brake cylinder pressure and that such recharging will terminate when pressure in the brake cylinder device 5 and hence in chamber 62 is reduced to a degree sufficient to cause slide valve 52 to be shifted to lap position, in the manner previously described, for bottling up fluid in said brake cylinder device at such reduced pressure. However, in the case of a full release of the brakes, pressure in chamber 51 will be increased to substantially normal operating pressure in the brake pipe 1 and thus cause slide valve 52 to remain in normal position for completely releasing fluid under pressure from the brake cylinder device 5 and chamber 62; and during such release, the auxiliary reservoir 4 will be recharged from the brake pipe 1 by flow via previously described communication, including chamber 51, slide valve cavity 71 and check valve 109, until auxiliary reservoir pressure has been increased to within the illustrative 1.7 p. s. i. of that in chamber 51, whereupon the said check valve will be seated by the combined effect of auxiliary reservoir pressure and action of spring 112 for suspending recharge of said auxiliary reservoir.

Since chamber 81 of exchaust valve device 10 is open to brake cylinder passage 64, pressure in said chamber will reduce uniformly with brake cylinder pressure. Hence when, during a complete release of the brakes, pressure in chamber 81 has been reduced to substantially atmospheric, the exhaust valve bias spring 87 will deflect the diaphragm 80 to its previously defined exhaust position, in which it is shown in the drawing, for thereby releasing flud under pressure from the quick service volume 44 to atmosphere via passage 92, choke 93, slide valve cavity 91 and exhaust passage 90 so that said quick service volume will be in a vented condition for effecting a local reduction in brake pipe pressure during the next brake application, in the manner above described in connection with a service application of the brakes; and at the same time, fluid under pressure hitherto bottled up in the timing volume 46 and pressure chamber 13 of charging valve device 7 will be released to atmosphere at the rate controlled by choke 89, via branches of passage 47, exhaust slide valve cavity 88, and said exhaust passage 90. When pressure in chamber 13 has thus blown down to substantially atmospheric, diaphragm 12 will be deflected by bias spring 18 for shifting slide valve 16 to charging position; it being noted that the auxiliary reservoir 4 will have already been charged to a pressure within the illustratve 1.7 p. s. i. of that in chamber 51 of service valve device 9, in the manner heretofore described. With slide valve 16 in charging position, the auxiliary reservoir 4 will be recharged to equality with brake pipe pressure, and pressures in the control reservoir 3 and brake pipe 1 will equalize, as previously described in connection with initial charging.

It will thus be noted that the engineer may maintain the handle of the aforementioned brake valve device in release position for a relatively long period of time for supplying fluid at main reservoir pressure to the brake pipe so as to effect a more rapid and uniform full release of the brakes throughout the train; such period includes, first, the time required for brake cylinder pressure to be substantially exhausted from chamber 81 of exhaust valve device 10 at the rate controlled by brake cylinder release choke 75 and then, after exhaust slide valve 85 has been shifted to exhaust position, the additional time required for pressure in the timing volume 46 and in chamber 13 of charging valve device 7 to blow down, at the rate controlled by choke 89, to substantially atmospheric pressure and thereby cause slide valve 16 of said charging valve device to be shifted to charging position.

It will therefore be noted that the capacity of choke 89 and timing volume 46 may be so selected as to defer movement of the charging slide valve 16 to charging position for any desired minimum period of time after exhaust slide valve 85 moves to exhaust position during a brake releasing operation for thereby preventing overcharge of the control reservoir 3 and auxiliary reservoir 4 during such period.

*Operation in event of excessive brake cylinder leakage*

Assume that, due for example to a broken brake cylinder pipe or defective brake cylinder packing, brake cylinder leakage will exceed the aforementioned permissible limit, as determined by the flow capacity of the restricted maintaining port 76.

Under this condition, when brake pipe pressure is initially reduced below normal operating value for causing a brake application, the service slide valve 52 will be shifted from release to application position in the manner already described; whereupon the cavity 71 will disconnect the brake pipe from the check valve 109, and fluid under pressure will flow from the auxiliary reservoir 4 to atmosphere via the application choke 121 and the defective pipe or packing and thus prevent development of sufficient brake cylinder pressure in chamber 62 to cause said slide valve to shift to lap position. Since the exhaust valve device 10 is controlled by brake cylinder pressure, its slide valve 85 will remain in or return to exhaust position, in which it is shown, with the result that fluid under pressure earlier supplied to the charging valve chamber 13 (by operation of the quick service valve device 8 to quick service position) will be released into the atmospheric chamber 82 of device 10 at the rate controlled by choke 89, and hence cause the charging slide valve 16 to shift to charging position. With the charging slide valve 16 in this position, some fluid under pressure will flow from the brake pipe and through choke 21 to the auxiliary reservoir passage 20 and thence to atmosphere via the defective pipe or packing, but at the same time fluid under pressure will be released from the control reservoir 3 and hence chamber 50 into the brake pipe 1 at the rate controlled by choke 24 until brake pipe pressure in chamber 51 as assisted by spring 65 overcomes the opposing effect on the diaphragm stack of reduced control reservoir pressure in chamber 50 and causes the service slide valve 52 to be shifted to release position; whereupon the auxiliary reservoir 4 and the brake pipe 1 will be cut off from the leaking brake cylinder pipe or packing and the cavity 71 will reconnect the brake pipe to the auxiliary reservoir via the check valve 109 and choke 111, with the result that the auxiliary reservoir will be recharged from the brake pipe by way of the charging choke 111 and also the choke 21 to a value corresponding to reduced brake pipe pressure; it being noted that the drain on the brake pipe will decrease as the driving head in the brake pipe decreases due to build up in auxiliary reservoir pressure.

It should be noted that fluid under pressure will be released from the brake pipe to atmosphere for only a short period commencing when the charging slide valve 16 moves to charging position (in which the brake pipe is opened to the auxiliary reservoir) and ending when the service slide valve 52 is shifted from application to release position; whereupon the auxiliary reservoir on the single affected car will be recharged from the brake pipe via chokes 111 and 21 with a minimum of drain on the brake pipe, and after said reservoir is recharged, the local drain on the brake pipe will thereupon cease. The auxiliary reservoir 4 and control reservoir 3 will be recharged upon a subsequent increase in brake pipe pressure, in essentially the same manner as during initial charging.

*Emergency application and release of the brakes*

To effect an emergency application of the brakes, the pressure of fluid in the brake pipe 1 at the locomotive is reduced, by manual operation of the aforementioned engineer's automatic brake device, to or below a chosen value, lower than that corresponding to a full service reduction in brake pipe pressure. The apparatus functions in the same manner as previously described in connection with a service application of the brakes, until brake pipe pressure in passage 19 and hence in chamber 96 of the high pressure valve device 11 on a particular car is reduced to or below said chosen value and causes diaphragm 94 to be shifted to its previously defined emergency position by preponderant effect of emergency reservoir pressure in chamber 97 overcoming the effect of regulating spring 104 and reduced pressure in chamber 96; whereupon the follower stem 99, through the medium of the retaining ring 103, will carry valve 102 out of engagement with seat rib 106 for thereby causing fluid under pressure from the emergency reservoir 6 to flow via passage 98 and past unseated valve 102 to brake cylinder passage 64. Fluid under pressure thus supplied to the brake cylinder device 5 by way of passage 64 will supplement flow from the auxiliary reservoir 4 by way of service valve device 9, in the manner described in connection with a service application of the brakes, and the increased brake cylinder pressure thus obtained will cause the train to be brought to a stop in a shorter distance than could otherwise be accomplished.

It should be noted that during an emergency application of the brakes, the velocity at which the brake actuating pressure reduction wave is propagated through the brake pipe 1 is the same as that obtained during a service application of the brakes. This follows from the fact that the quick service valve devices 8 on the respective cars operate in exactly the same manner, during either type of brake application, to propagate the brake actuating pressure reduction wave rearward through the brake pipe 1; and such operation is unaffected by operation of the high pressure valve 11 in supplying fluid under pressure from the emergency reservoir 6 to the brake cylinder device 5 after a substantial reduction in brake pipe pressure has already been effected on a particular car.

When, in order to effect a release of the brakes, brake pipe pressure is increased in the manner heretofore described, the high pressure valve diaphragm 94 will deflect to normal position as soon as the combined effect of increasing pressure in chamber 96 and action of regulating spring 104 overcomes the opposing effect of emergency reservoir pressure in chamber 97; it being noted that as brake pipe pressure increases above emergency reservoir pressure, the emergency reservoir 6 will be recharged by flow of fluid via brake pipe passage 19 and past check valve 114 to emergency reservoir passage 98 at the rate controlled by choke 117.

*Summary*

It will thus be seen that the improved brake apparatus is not only relatively inexpensive to manufacture but also embodies an emergency feature for providing increased brake cylinder pressure when an emergency application of brakes is effected by a reduction in pressure in the brake pipe to or below a chosen value, lower than that corresponding to a full service reduction. It will also be noted that the same rapid rate of propagation of the quick service reduction wave is obtained in during both a service application and an emergency application of the brakes.

It will further be noted that the improved apparatus embodies a novel exhaust valve device 10 which is operative to open the quick service volume 44, the timing volume 46 and the pressure chamber 13 of charging valve device 7 to atmosphere when brake cylinder pressure is less than a chosen low value and is operative to close said volumes 44, 46 and said pressure chamber from atmosphere when brake cylinder pressure exceeds said chosen low value.

Having now described my invention, what I claim as new and desire to secure by Letters Patent, is:

1. In a fluid pressure brake apparatus of the type comprising a brake cylinder device, a brake pipe, and a charging valve device controlled by pressure of fluid in a chamber and operative to open said brake pipe to a control reservoir and an auxiliary reservoir only when fluid pressure in said chamber is below a certain low value, the combination of a timing volume constantly open to said chamber, first valve means for supplying fluid under pressure to said timing volume and chamber in response to a reduction in pressure in said brake pipe and closing off such supply upon an increase in such pressure, second valve means controlled by fluid pressure in said brake cylinder device and operative when said brake cylinder device is substantially devoid of fluid under pressure to release fluid under pressure from said timing volume and chamber to atmosphere via a passageway containing a restriction and operative so long as said brake cylinder device is charged with fluid under pressure to prevent such release, said timing volume and restriction being of such selected sizes as to so regulate the rate at which fluid pressure in said chamber blows down to said certain value as to defer opening of said brake pipe to said control reservoir and auxiliary reservoir for any selected minimum period of time.

2. In a fluid pressure brake apparatus, the combination of a brake cylinder device, a brake pipe, an auxiliary reservoir, an emergency reservoir, first valve means controlled by pressure of fluid in a chamber and operative to open said brake pipe to said auxiliary reservoir only when said chamber is substantially devoid of fluid under pressure, second valve means for supplying fluid under pressure to said chamber responsively to at least a slight reduction in pressure in said brake pipe and also locally effecting a quick service reduction in such pressure and responsive to an increase in brake pipe pressure to close off such supply, third valve means responsive to a reduction in pressure in said brake pipe to supply fluid under pressure from said auxiliary reservoir to said brake cylinder device and responsive to an increase in pressure in said brake pipe to release fluid under pressure from said brake cylinder device, high pressure valve means for supplying fluid under pressure from said emergency reservoir to said brake cylinder device only in response to a reduction in brake pipe pressure in excess of a chosen degree below emergency reservoir pressure, and fourth valve means controlled by fluid under pressure in said brake cylinder device and operative when pressure in said brake cylinder device is below a preselected, substantially atmospheric value to release fluid under pressure from said chamber to atmosphere via a passageway containing a restriction and operative so long as pressure in said brake cylinder device is above said preselected value to prevent such release.

3. In a fluid pressure brake apparatus, in combination, a brake pipe, a brake cylinder device, an auxiliary reservoir, an emergency reservoir, a control reservoir, and a brake controlling valve device comprising a charging valve device controlled by pressure of fluid in a chamber and operative when said chamber is substantially devoid of fluid under pressure to connect said control reservoir and auxiliary reservoir with said brake pipe and operative when said chamber is charged to disestablish such connection, a quick service valve device operative upon at least a slight reduction in pressure in said brake pipe relative to that in said auxiliary reservoir to locally effect a further reduction in pressure in said brake pipe and also supply fluid under pressure from said auxiliary reservoir to said chamber, a service valve device responsive to a reduction in pressure in said brake pipe to supply fluid under pressure from said auxiliary reservoir to said brake cylinder device, a choke, an exhaust valve device controlled by pressure in said brake cylinder device and operative when such pressure is below a preselected low value to release fluid under pressure from said chamber to atmosphere at the rate controlled by said choke and operative when brake cylinder pressure is above said value to prevent such release, a high pressure valve device responsive to a reduction in pressure in said brake pipe to a certain value considerably below such further reduced value to supply fluid under pressure from said emergency reservoir to said brake cylinder device, and means whereby said emergency reservoir is charged from said brake pipe at a controlled rate whenever pressure in said brake pipe exceeds that in said emergency reservoir.

4. In a fluid pressure brake apparatus, the combination of a brake pipe, an auxiliary reservoir, a control reservoir, fluid pressure operable brake applying means, charging valve means responsive to release of fluid under pressure from a first chamber to permit equalization of fluid pressures in said brake pipe, auxiliary reservoir and control reservoir and responsive to supply of fluid under pressure to said first chamber to prevent such equalization, valve means responsive to a slight reduction in brake pipe pressure to supply fluid under pressure to said first chamber, a choke, exhaust valve means having a second chamber open to said brake applying means and responsive to release of pressure from said second chamber to release fluid under pressure from said first chamber at the rate controlled by said choke, and responsive to supply of fluid under pressure to said brake applying means to prevent such release, service valve means responsive to a reduction in brake pipe pressure below control reservoir pressure to supply fluid under pressure from said auxiliary reservoir to said brake applying means and responsive to a subsequent increase in brake pipe pressure to release fluid under pressure from said brake applying means, a normally charged emergency reservoir, high pressure valve means normally preventing flow of fluid under pressure from said emergency reservoir to said brake applying means and responsive to a reduction in brake pipe pressure below a chosen value to permit such flow.

5. In a fluid pressure brake apparatus, the combination of a brake pipe, a brake cylinder device, an auxiliary reservoir, a control reservoir, a passage normally open to said brake pipe, check valve means permitting flow of fluid under pressure from said passage to said auxiliary reservoir and preventing flow in the reverse direction, a choke controlling the rate of flow through said passage, a restricted port, a service valve device comprising a diaphragm stack and service valve means movable in one direction by control reservoir pressure and in the opposite direction by the combined effect of brake pipe pressure and brake cylinder pressure, said stack normally being biased to a release position for disconnecting said auxiliary reservoir from said brake cylinder device and venting the latter and responsive to a reduction in brake pipe pressure below control reservoir pressure to shift said service valve means in said one direction to an application position for supplying fluid under pressure from said auxiliary reservoir to said brake cylinder device and closing off said passage from said brake pipe, said stack being responsive to a rate of brake cylinder leakage not exceeding the rate of flow of fluid under pressure through said restricted port to shift said service valve means to a leakage maintaining position intermediate said application and release positions for supplying fluid under pressure from said auxiliary reservoir to said brake cylinder device by way of and at the rate controlled by said restricted port and opening said passage to said brake pipe for permitting replenishment of auxiliary reservoir pressure from said brake pipe via said check valve means.

6. A fluid pressure brake apparatus comprising, in combination, a normally charged brake pipe, a control reservoir containing fluid at the normal charge value of brake pipe pressure, fluid pressure operable brake applying means, an auxiliary reservoir, an emergency reservoir, first valve means controlled by control reservoir pressure opposing brake pipe pressure and pressure of fluid in said brake applying means and responsive to a reduction in brake pipe pressure below control reservoir pressure irrespective of the rate of such reduction to supply fluid from the auxiliary reservoir to the brake applying means at a pressure corresponding to the extent of such reduction in brake pipe pressure, and second valve means normally biased to one position for disconnecting said emergency reservoir from said brake applying means and responsive to a reduction in brake pipe pressure to below a chosen value irrespective of the rate of such reduction to connect the emergency reservoir to said brake applying means for supplying fluid under pressure from the emergency reservoir to the brake applying means concurrently with the supply of fluid under pressure from the auxiliary reservoir to said brake applying means by operation of said first valve means.

7. A fluid pressure brake apparatus comprising, in combination, a normally charged brake pipe, a control reservoir containing fluid at the normal charge value of brake pipe pressure, fluid pressure operable brake applying means, an auxiliary reservoir, an emergency reservoir, first valve means controlled by control reservoir pressure opposing brake pipe pressure and pressure of fluid in said brake applying means and responsive to a reduction in brake pipe pressure below control reservoir pressure irrespective of the rate of such reduction to supply fluid from the auxiliary reservoir to the brake applying means at a pressure corresponding to the extent of such reduction in brake pipe pressure and responsive to a subsequent increase in brake pipe pressure to release fluid under pressure from said brake applying means to an extent corresponding to the extent of such subsequent increase, a communication via which fluid under pressure may flow from said emergency reservoir to said brake applying means, second valve means controlled by brake pipe pressure and a spring bias opposing emergency reservoir pressure and normally closing said communication and responsive to a reduction in brake pipe pressure below a chosen value irrespective of the rate of such reduction to open said communication, such that fluid under pressure will be concurrently supplied to said brake applying means from said auxiliary reservoir and emergency reservoir by said first and second valve means, respectively.

References Cited in the file of this patent
UNITED STATES PATENTS

| | | |
|---|---|---|
| 973,179 | Doan | Oct. 18, 1910 |
| 1,819,505 | Farmer | Aug. 18, 1931 |
| 1,936,966 | Kasantzeff | Nov. 28, 1933 |
| 1,957,692 | Campbell | May 8, 1934 |
| 2,031,213 | Farmer | Feb. 18, 1936 |
| 2,034,307 | McClure | Mar. 17, 1936 |
| 2,707,134 | Cook | Apr. 26, 1955 |